United States Patent [19]

George

[11] Patent Number: 5,565,746
[45] Date of Patent: Oct. 15, 1996

[54] DYNAMIC FOCUS COUPLING

[75] Inventor: John B. George, Carmel, Ind.

[73] Assignee: Thomson Consumer Electronics, Inc., Indianapolis, Ind.

[21] Appl. No.: 365,455

[22] Filed: Dec. 28, 1994

[51] Int. Cl.$^6$ .................................................. G09G 1/04
[52] U.S. Cl. ........................................................ 315/382
[58] Field of Search ................................ 315/382, 382.1; 361/321.6; 333/206, 24 C

[56] References Cited

U.S. PATENT DOCUMENTS

| 4,081,770 | 3/1978 | Mayer | 361/306 |
| 4,281,360 | 7/1981 | Brehse | 361/306 |
| 4,704,630 | 11/1987 | Rodda. | |
| 5,040,091 | 8/1991 | Yamaoka et al. | 361/302 |

FOREIGN PATENT DOCUMENTS

| 2090090 | 6/1982 | United Kingdom. |
| 2239148 | 6/1991 | United Kingdom. |

*Primary Examiner*—Gregory C. Issing
*Attorney, Agent, or Firm*—Joseph S. Tripoli; Joseph J. Laks; Daniel E. Sragow

[57] ABSTRACT

A dynamic focus voltage generating circuit comprises a source of DC voltage coupled to a focus electrode of a cathode ray tube. A source of varying voltage is coupled to the focus electrode through a capacitance formed by a pair of coaxial conductors. The outer conductor of said coaxial pair is coupled to said source of varying voltage, and the inner conductor of said coaxial pair is coupled to said source of DC voltage.

12 Claims, 1 Drawing Sheet

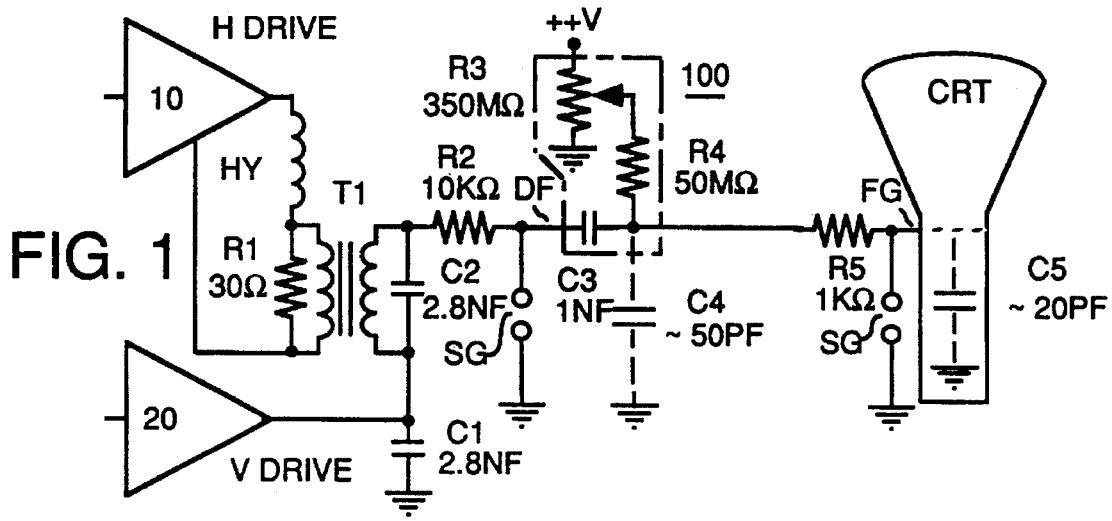
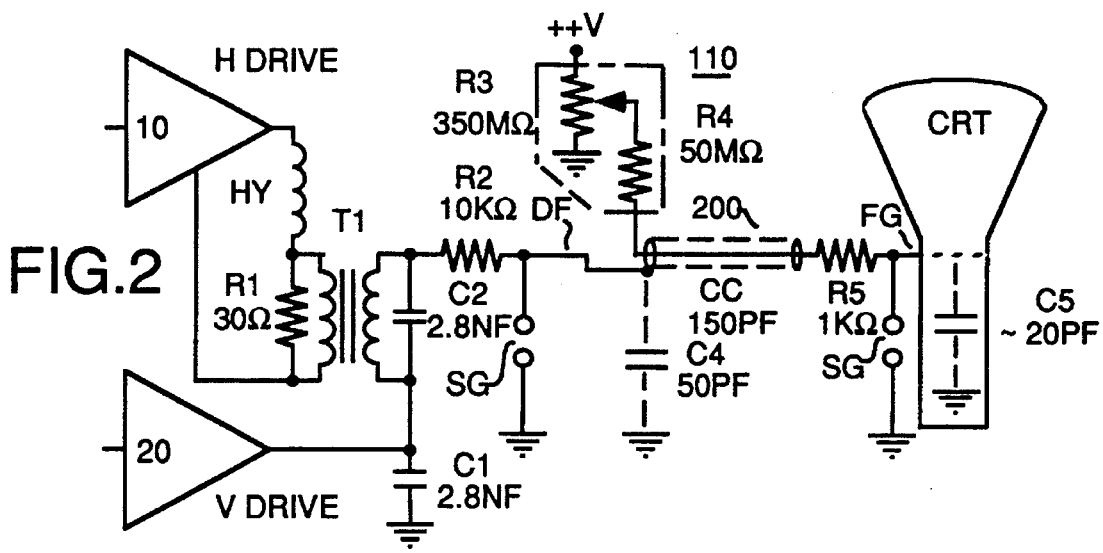
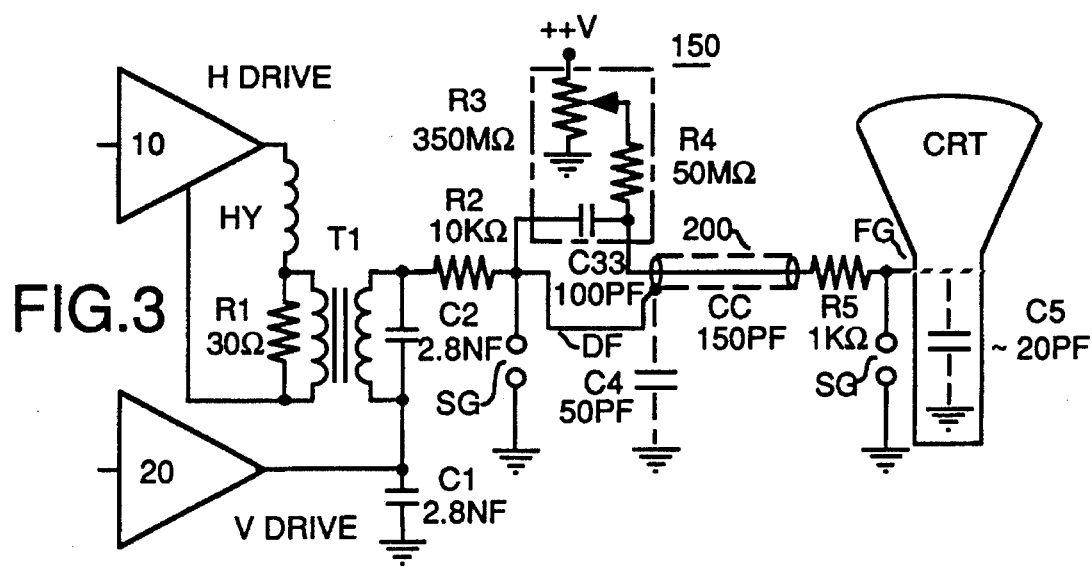

DYNAMIC FOCUS COUPLING

This invention relates to the field of video image display, and in particular, to electrostatic focus voltage modulation in a cathode ray tube.

BACKGROUND OF THE INVENTION

The scanning electron beam in a cathode ray display tube may be subject to defocusing due to the variation in distance from the electron gun to the screen as the beam scans horizontally and vertically. Such defocusing effects may be corrected by the use of dynamic focusing or DF, where an AC signal voltage which varies with deflection is superimposed on a DC, static focusing potential. Such a dynamic focusing arrangement is shown in U.S. Pat. No. 5,043,638 to Yamashita. The AC signal voltage may comprise a summation of a horizontal frequency parabolic shaped signal and a vertical frequency parabolic shaped signal. In a typical dynamic focusing system, the DC static focus potential applied to a focus electrode is adjustable, and may be about 9 kilovolts (KV). The AC signal voltage may be coupled to a focusing electrode by a capacitor. Such a DF coupling capacitor must have sufficient capacitance to couple the low frequency parabolic components of the AC signal voltage to the focus electrode. In addition, the capacitor requires a breakdown voltage rating of, for example, 15 KV. A DF coupling capacitor may be encapsulated or potted together with a resistive potential divider which generates the DC focusing potential. The DC focusing potential may be derived from either the ultor (EHT) supply voltage of, for example approximately 30 KV, or from a ⅓ tap on an integrated high voltage transformer (IHVT), which produces a voltage of, for example approximately 10 KV. However, in either case, a large value series resistor, for example 50 MΩ, may be required to limit current flow during EHT arcing to the focus electrode within the tube.

FIG. 1 illustrates, in simplified form, a typical dynamic focusing arrangement where a DF signal, resulting from summation of horizontal and vertical parabolic shaped signals in a transformer T1, is coupled via a capacitor C3 to a focusing grid FG of a cathode ray tube (CRT). The wire harness between DF coupling capacitor C3, the focus potential divider 100 and the focus grid FG in the CRT, may exhibit stray capacitance, for example, on the order of 50 pF, shown as capacitor C4. The internal tube structure may introduce further shunting stray capacitance of, for example 20 pF, shown as capacitor C5. Thus, the AC coupled dynamic focusing signal is subject to attenuation by a capacitive voltage divider formed by coupling capacitor C3 and the shunting capacitance of capacitors C4 and C5.

It is desirable that such stray capacitance be minimized and well controlled, and to this end, lead dressing may control stray or distributed capacitance by spacing the leads from other conductors. However, this technique is inconvenient and may be impractical in mass production. In addition, it may not be completely effective, so as to require the DF coupling capacitor C3 to be increased in value in order to reduce the potential divider action of the stray capacitance. However, the high breakdown voltage rating requirement of the DF coupling capacitor C3 imposes a significant increase in the size and cost of the capacitance if its value is increased.

In order to compensate for the attenuation of the DF signal by the capacitive voltage division, the amplitude of the DF signal may be increased to compensate for the attenuation. However, this may require DF signal amplifiers having higher power capability, and higher breakdown voltage. In addition, transformer T1 may require a higher rated value of core saturation or corona breakdown level.

It is also desirable that a focus divider be utilized which operates coupled to a ⅓ tap on the integrated high voltage transformer (IHVT, not shown), since such a divider is widely used and does not require potting, and thus is of lower cost than an encapsulated unit. Furthermore, it would be desirable to use a DF coupling capacitor which does not need to be potted in order to prevent arcing across its electrodes.

SUMMARY OF THE INVENTION

In accordance with the invention, a dynamic focus voltage generating circuit comprises a source of DC voltage coupled to a focus electrode. A source of varying voltage is coupled to the focus electrode through a capacitance, formed as a pair of coaxial conductors. The outer conductor of said coaxial pair may be coupled to said source of varying voltage, and the inner conductor of said coaxial pair may be coupled to said source of DC voltage.

BRIEF DESCRIPTION OF THE DRAWING

FIG. 1 illustrates, in simplified form, a typical dynamic focusing arrangement.

FIG. 2 illustrates, in simplified form, an inventive dynamic focusing arrangement.

FIG. 3 illustrates a hybrid dynamic focusing arrangement using the principles of the invention.

DETAILED DESCRIPTION

One approach to providing a dynamic focus voltage is shown in FIG. 1. Divider 100, comprising variable resistor R3 and resistor R4, produces a DC focus voltage which is fed through resistor R5 to focus electrode FG. An AC dynamic focus voltage DF is derived from horizontal drive amplifier 10 and vertical drive amplifier 20. The horizontal drive signal is fed through inductance HY and resistor R1 to transformer T1, and outputted across capacitor C2 and resistor R2. Vertical drive voltage is outputted across capacitor C1 and summed with the horizontal drive voltage to produce dynamic focus voltage DF.

Dynamic focus voltage DF is summed with the DC focus voltage through capacitor C3.

In the event that arcing occurs within the cathode ray tube (CRT) which may apply a high voltage to the focus electrode, either or both of spark gaps SG will become conductive to dissipate the energy applied to the focus electrode, so as to protect the circuitry.

In the arrangement shown in FIG.1, there is unavoidable stray capacitance, shown as capacitor C4, and the capacitance within the cathode ray tube of the focus electrode, shown as capacitor C5. Capacitors C4 and C5 form a voltage divider with capacitor C3, which reduces the level of AC voltage which is applied to the focus electrode FG. This problem of reduced AC voltage may be overcome by either increasing the value of capacitor C3 or by increasing the value of dynamic focus voltage DF. Increasing the value of capacitor C3 is undesirable since this capacitor must be rated at or above the value of the focus voltage, nominally about 10 KV. Such a high voltage capacitor tends to be large and expensive and must often be potted in order to prevent arcing across electrodes. Increasing the value of the AC dynamic focus voltage DF requires larger amplifiers which are bulky and consume increased energy.

FIG. 2 shows a preferred embodiment of the invention. FIG. 2 is similar to FIG. 1, except that capacitor C3 has been replaced by capacitor CC, formed as two coaxial conductors 200. The inner conductor couples the direct current from divider 110 through resistor R5 to the focusing electrode FG of the cathode ray tube, whereas the outer conductor is coupled to the source of dynamic focus voltage DF. With this arrangement, the coaxial pair takes the place of coupling capacitor C3. Stray capacitance C4 appears in parallel with the output capacitance of the AC source, rather than in parallel with focus electrode capacitance C5. In this way, stray capacitance C4 does not form a capacitive voltage divider with the capacitance of the coaxial pair, so that the only capacitance which acts to reduce the value of the dynamic focus portion of the focus voltage is the capacitance of the focus electrode itself, shown as capacitor C5. Since capacitor C5 has a relatively low value, on the order of 20 pF, the value of the dynamic focusing voltage at the focus electrode FG is kept at its proper value without the need for an increased value of dynamic focusing voltage or an increased value of the coupling capacitance C3. Furthermore, a potted capacitor is not needed.

Capacitor CC is constructed as a coaxial conductor around the DC focus wire so as to form a shield. This shield can take the form of a metalized insulative tape, such as Mylar, with a drain wire, a woven braid, a spiral spring, or some other structure that uses the dielectric of the focus wire insulation as the dielectric of a distributed capacitor. The length of such a coaxial structure is typically about 18" (46 cm.), and has a capacitance of about 150 pF. If the length of the coaxial structure is increased, the capacitance is correspondingly increased, which further reduces the loss in DF signal.

FIG. 3 shows another embodiment of the invention which uses the principles shown in FIG. 2. An off-the-shelf voltage divider package 150 may include a capacitor C33, having a typical value of 100 pF. In applications which require a very high level of dynamic focusing voltage, such as in applications using multiple cathode ray tubes, the value of capacitance C33 may be insufficient. In such a case, a hybrid arrangement may be used consisting of coaxial conductor pair 200 coupled in parallel with coupling capacitor C33. Because of the use of coaxial conductor pair 200, an off-the-shelf voltage divider package may be used without expensive modification.

What is claimed is:

1. A dynamic focus voltage generating circuit comprising:
   a) a source of DC voltage coupled to a focus electrode, and
   b) a series path comprising a source of varying voltage, a capacitance, and said focus electrode, said capacitance having the form of a pair of coaxial conductors, in which the outer conductor of said coaxial pair is coupled to said source of varying voltage.

2. A circuit as defined by claim 1, comprising a second capacitance coupled in parallel with said coaxial pair.

3. A circuit as defined by claim 2, in which said second capacitance is coupled to the output of said source of varying voltage and to said inner conductor.

4. A circuit as defined by claim 1, in which said source of varying voltage varies at a horizontal deflection rate.

5. A circuit as defined by claim 1, in which said source of varying voltage varies at a vertical deflection rate.

6. A circuit as defined by claim 1, in which said source of varying voltage varies at both a horizontal deflection rate and a vertical deflection rate.

7. A circuit as defined by claim 1, comprising a resistance coupled in series with said focus electrode.

8. A circuit as defined by claim 7, in which said resistance is coupled between said capacitance and said focus electrode.

9. A circuit as defined by claim 1, in which said capacitance comprises an insulated wire surrounded by a shield.

10. A circuit as defined by claim 9, in which said shield is a metalized insulative tape.

11. A dynamic focus voltage generating circuit comprising:
    a) a source of DC voltage coupled to a focus electrode, and
    b) a series path comprising a source of varying voltage, a capacitance, and said focus electrode, said capacitance having the form of a pair of coaxial conductors, in which the inner conductor of said coaxial pair is coupled to said source of DC voltage.

12. A dynamic focus voltage generating circuit comprising:
    a) a source of DC voltage coupled to a focus electrode, and
    b) a series path comprising a source of varying voltage, a capacitance, and said focus electrode, said capacitance having the form of a pair of coaxial conductors, in which the outer conductor of said coaxial pair is coupled to said source of varying voltage and the inner conductor of said coaxial pair is coupled to said source of DC voltage.

* * * * *